United States Patent Office 2,994,977
Patented Aug. 8, 1961

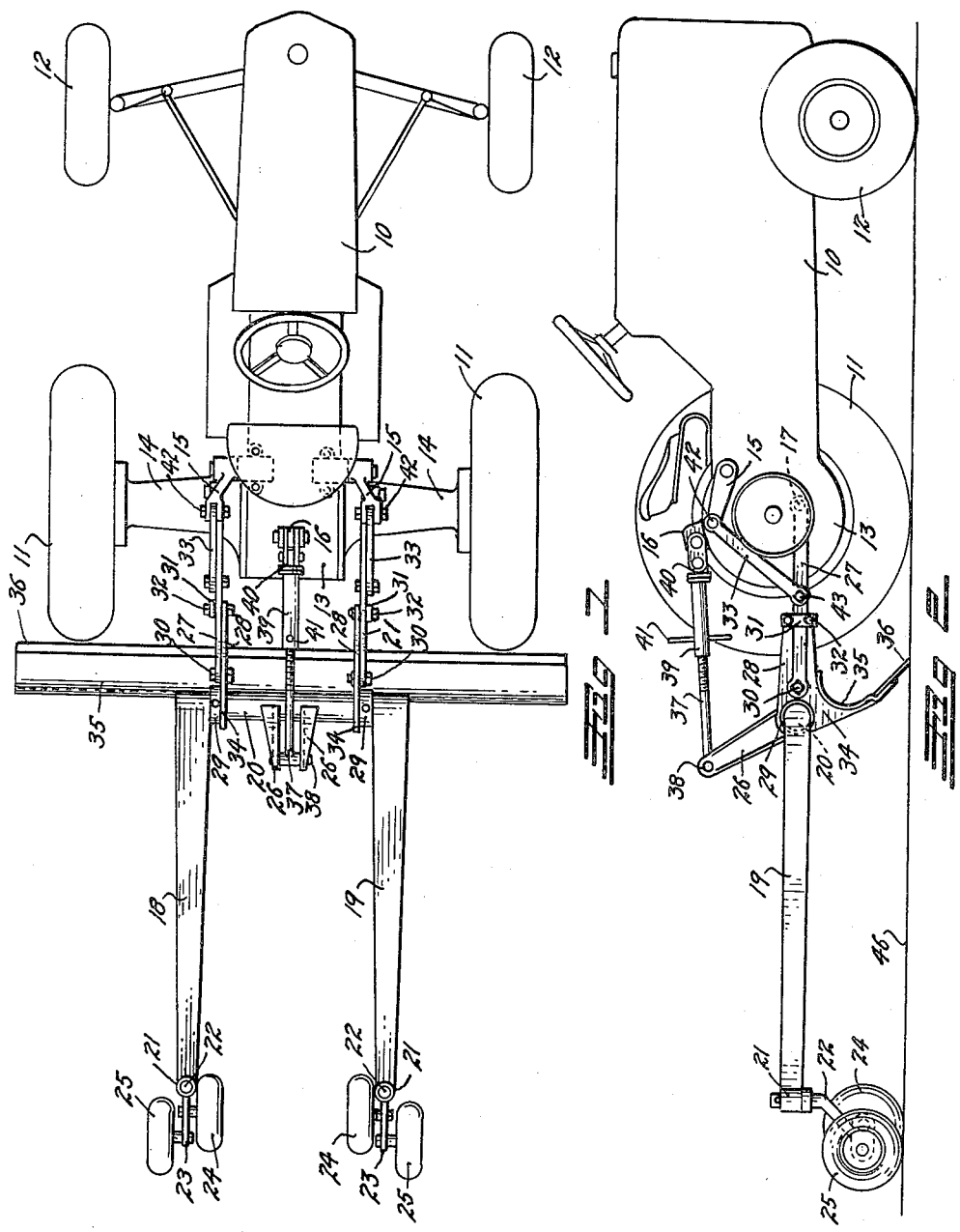

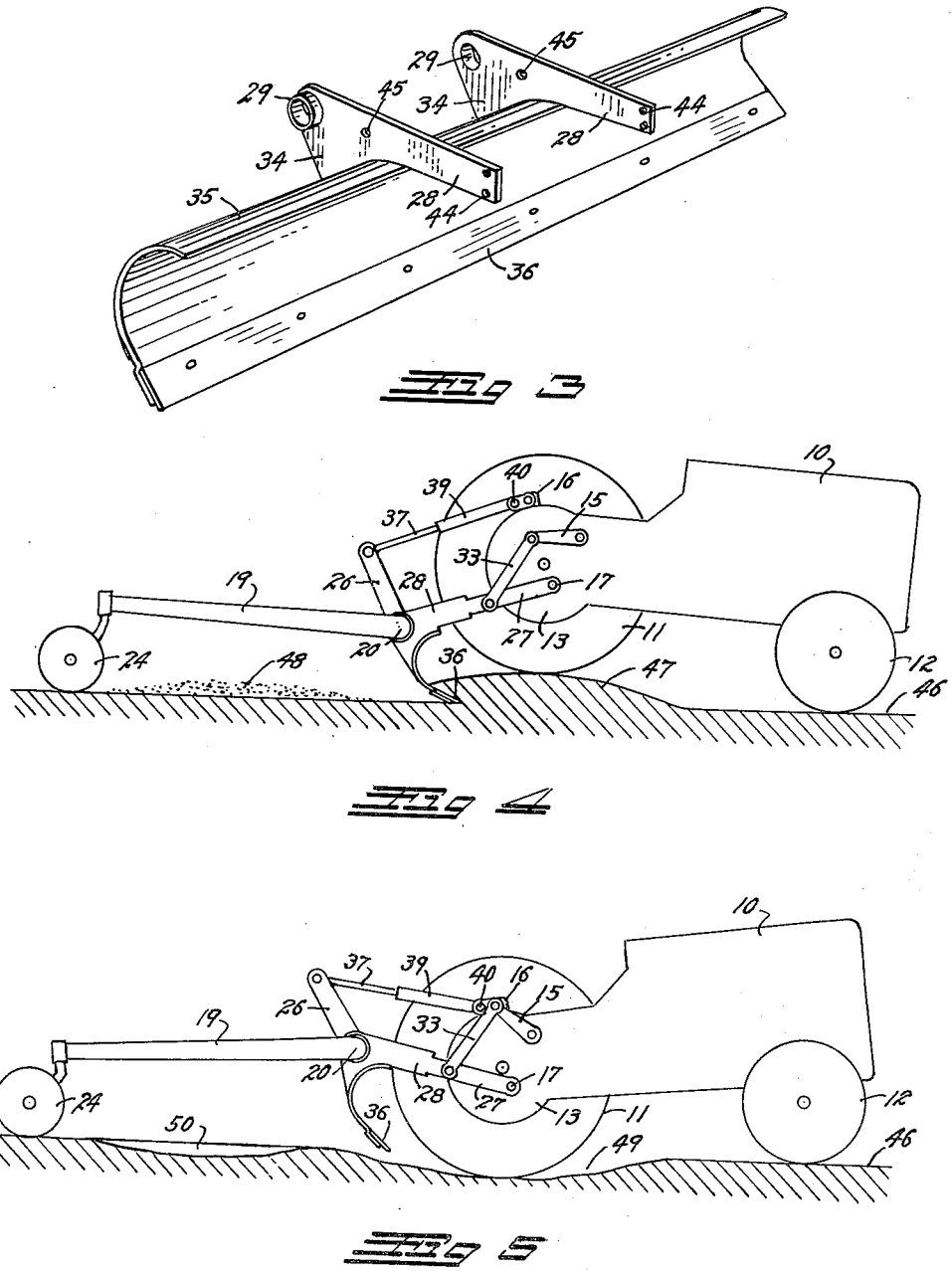

2,994,977
LAND LEVELING ATTACHMENT
FOR TRACTORS
Lawrence E. Shumaker and Stanley E. Hill, Denver, Colo., assignors to Eversman Manufacturing Co., Denver, Colo., a corporation of Colorado
Filed Dec. 31, 1958, Ser. No. 784,224
5 Claims. (Cl. 37—153)

This invention relates to an implement for attachment to a farm tractor to enable the tractor to be used for land smoothing and leveling purposes.

The principal object of the invention is to provide an exceedingly simple, lightweight, economical, and highly efficient leveling attachment or "float" which can be quickly and easily attached to a conventional farm tractor and which will operate efficiently and automatically to smooth out the high spots and fill the low spots in a field so as to quickly bring the field to a smooth level condition; and to provide a relatively small, lightweight, and economical tractor float attachment which will serve the purposes for which the heavy, expensive, land-leveling implements are at present in use.

Attempts have been made to mount a scraper blade directly behind a tractor for land scraping purposes. When used for land smoothing purposes, such a mounting is unsatisfactory for the blade will move upwardly and downwardly as the rear wheels of the tractor move upwardly and downwardly over uneven ground. Therefore, a constant manual control is required to maintain the blade on a smooth level plane. A further object of this invention is to provide an automatically operating linkage between the tractor and the blade which will act to maintain the blade on a given plane regardless of vertical movements of the tractor rear wheels.

A still further object is to construct a device, so that it can be quickly and easily elevated from a working position for transport or turning purposes and lowered to the working position for land smoothing and leveling purposes by the tractor operator without it being necessary for him to leave his seat.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a plan view of the improved land leveling attachment for tractors illustrating the latter in place on a conventional farm tractor of the type provided with hydraulic implement lift arms;

FIG. 2 is a side view of the leveler and tractor of FIG. 1 with the near rear wheel of the tractor removed for clarity of illustration;

FIG. 3 is a detail prospective view of a leveling blade as used in the improved leveling attachment; and FIGS. 4 and 5 are diagrammatic views illustrating the automatic leveling action of the improved attachment.

On FIGS. 1 and 2 only sufficient parts of a farm tractor 10 of the hydraulic lift type are illustrated to show the manner of mounting the improved attachment thereon. In FIGS. 4 and 5 the elements of the tractor and the improved attachment are simply outlined for diagrammatic purposes. Various conventional elements of the tractor are designated by numeral as follows: rear tractor wheels 11, front tractor wheels 12, center gear housing 13, rear axle housings 14, hydraulic lift arms 15, upper implement attachment lug 16, lower implement attachment studs 17, draw bar arms 27, and hydraulic lift links 33. In the usual farm tractor of this type the upper attachment lug 16 is for the purpose of mounting a hydraulic control spring on the gear housing 13. For the purpose of this invention, the control spring is removed and attachment is made directly to the lug 16. The lower attachment studs 17 project fixedly and oppositely outward from the sides of the gear housing 13 forwardly of and below the rear wheel axis. One of the draw bar arms 27 extends rearwardly and pivotally from each stud. Each draw bar arm is supported by one of the lift links 33 which is connected at its upper extremity to one of the lift arms 15 as shown at 42 and at its lower extremity to the draw bar arm 27 as shown at 43. Except when raising an attached implement, lift links 33 transmit neither upward nor downward pressure on drawbar arms 27. They are so arranged as to leave drawbar arms 27 freely floating about the lower implement attachment studs 17. The improved attachment is designed to be attached to and to make use of the above conventional elements.

The improved land-leveling attachment embodies a substantially horizontal U-shaped frame consisting of two hollow rearwardly extending side arms 18 and 19, welded, or otherwise affixed, at their forward extremities to a transversally-extending axle tube 20, which maintains them rigidly in parallel relation. Each of the side arms 18 and 19 terminates at its rear extremity in a vertical bearing sleeve 21 in each of which a vertical caster bracket set 22 is rotatably mounted.

The caster brackets extend downwardly and rearwardly and each terminates in a horizontally positioned bearing plate 23. An inside caster wheel 24 is rotatably mounted on the inside face of each bearing plate 23 and an outside caster wheel 25 is similarly mounted on the outside face of each bearing plate 23. The axes of the two inside caster wheels 24 are horizontally and longitudinally spaced from the axes of the two outside caster wheels 25 so that an increased ground contact is obtained in a longitudinal direction. This enables a ground contact to be obtained by means of two small caster wheels, which will equal the contact obtained by an exceedingly large caster wheel.

A mast 26 consisting of two similar parts is welded, or otherwise rigidly secured, to the mid-portion of the axle tube 20 and extends upwardly and rearwardly therefrom at an angle substantially corresponding to the relative angular position between the upper element attachment lug 16 and the lower implement attachment studs 17 of the tractor. In actual practice the angle between the plane of the side arms 18 and 19 and the mast 26 is substantially 60°.

The axle tube 20 is rotatably mounted in bearing sleeves 29 carried by extension plates 28 which are designed to be attached to the two draw bar arms 27. The attachment may be accomplished in any desired manner. As illustrated, the rear extremity of each draw bar arm 27 is bolted to its extension plate 28 by means of a suitable attachment bolt 30 and the forward extremity of each extension plate 28 is rigidly secured to its draw bar arm by means of a clamping strip 31 and suitable clamp bolts 32.

A curved gusset plate 34 is formed on or welded to each extension plate 28 and the gusset plates extend vertically downward from the axle tube 20 to support a transversally-extending curved mold board 35. The mold board is welded to or otherwise affixed on the two gusset plates 34 so as to extend transversally of, and rearwardly of, the two rear tractor wheels 11. A scraper blade 36 is affixed to and extends longitudinally of the lower edge of the mold board 35.

The upper extremity of the mast 26 is connected to the upper implement attachment lug 16 of the tractor 10 in any desired adjustable manner. As illustrated, a jackscrew 37 is rotatably mounted at its rear extremity upon a wrist pin 38 extending between the two parts of the mast 26 and a rotatable nut sleeve 39 is threaded on the jackscrew and extends forwardly to a swivel mounting 40 on the upper attachment lug 16. The jackscrew and nut assembly could be replaced, if desired, by any extensible device such as a hydraulic cylinder and plunger.

It can be seen that if the jackscrew and nut combination be extended, it will force the mast 26 rearwardly to elevate the axle tube 20 by using the caster wheels as a fulcrum. Contraction of the jackscrew and nut combination will, of course, accomplish the reverse, that is, it will tilt the mast 26 forwardly causing the axle tube 20 to descend. Therefore, the jackscrew and nut combination can be used to preset the edge of the scraper blade at the desired height relative to the plane of the wheels or level ground line. It can also be seen, that the hydraulic lift arms 15 may be actuated to cause the connecting links 33 to raise and lower the axle tube 20 so as to lift the scraper blade to the inoperative or lower it to the operative positions.

It will be noted that the tractor front wheels 12 and the caster wheels 24 determine the plane to which the ground is to be leveled or smoothed and the height of the scraper blade relative to this plane is automatically maintained regardless of vertical movements of the tractor rear wheels.

As an example, let us assume, the screw and nut combination 37—39 is adjusted to place the cutting edge of the scraper blade on a level plane with the ground contacts of the front wheels 12 and the caster wheels 24 and 25 as indicated by the ground line 46 in FIGS. 2, 4 and 5. Now let us assume, the tractor is driven forwardly over uneven ground and that a hump, as indicated at 47 in FIG. 4, is encountered. As the front wheels pass over the hump the blade 36 will elevate substantially one-half the height of the hump leaving a slight fill as indicated at 48 in FIG. 4.

As the rear wheels 11 travel over the hump, the forward tilt of the tractor tilts the mast 26 forwardly to depress the axle tube 20 and simultaneously swings the scraper blade and the arms 27 about the studs 17 so that the blade is maintained vertically stationary to cut away the hump to the ground line 46 as shown in FIG. 4.

In case the front wheels ride through a depression, as indicated at 49 in FIG. 5, the blade 36 will descend approximately one-half the depth of the depression to make a slight cut as indicated at 50. As the rear wheels 11 travel through the depression, the upward tilt of the tractor will swing the mast 26 rearwardly to lift the axle tube 20 while the blade 36 is simultaneously swung upwardly with respect to the studs 17 to maintain the cutting edge in the preset plane 46 so that it will fill the depression to the desired level.

Additional passes are made over the field in varying directions until all of the fills 48 and cuts 50 are brought to a perfectly smooth surface.

As illustrated, the extension plates 28 are provided with bolt holes 44 for receiving the clamp bolts 32 and with a bolt hole 45 for receiving the attachment bolt 30. For more convenient manual rotation of the nut sleeve 39, it is preferably provided with radially projecting hand grips 41.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A land leveling attachment for tractors comprising: a scraper blade; attachment members rigidly affixed to said blade and extending forwardly to said tractor; first attachment means pivotally securing the forward extremities of said attachment members to said tractor; a frame; means pivoting the forward extremity of said frame from said attachment members for vertical relative movement therebetween; castor wheels supporting the rear extremity of said frame; a mast fixedly mounted on and arising from and moving as a fixed unit with said frame; a connecting member extending forwardly from said mast to said tractor; and a second attachment means pivoting the forward extremity of said connecting member to said tractor above said first attachment means.

2. A land leveling attachment for tractors as described in claim 1 having means for varying the length of said connecting member so as to rotate said frame about its pivot on said attachment members.

3. A land leveling attachment for tractors as described in claim 2 in which the frame comprises a horizontal transversally-extending member extending across and being pivotally mounted in said attachment members, said side arms being rigidly secured at their forward extremities to the extremities of said transversally-extending member and extending rearwardly therefrom in substantially parallel arrangement, said castor wheels being mounted below the rear extremities of said side arms.

4. A land leveling attachment for a tractor of the type having an upper medially-positioned attachment lug and two, spaced apart, pivotally-mounted draw bar arms pivoted to said tractor below said attachment lug, comprising: a scraper blade; a mold board attached to and extending upwardly from and longitudinally of said scraper blade; a pair of extension plates rigidly secured to said mold board and extending upwardly and forwardly therefrom; means fixedly attaching each of said extension plates to one of said draw bar arms so as to move as a unit therewith; a wheeled frame pivotally supported at its forward extremity from said extension plates; a mast rigidly mounted on and extending upwardly from said frame so as to move as a unit therewith; and a connecting member connecting the upper extremity of said mast with the upper medially-positioned attachment lug of said tractor, so that a forward and downward tilt of said tractor will tend to impart a forward and downward tilt to said frame.

5. A land leveling attachment for tractors comprising: a scraper blade; attachment members rigidly affixed to said blade and extending forwardly to said tractor; first attachment means pivotally securing the forward extremities of said attachment members to said tractor; a frame; means pivoting the forward extremity of said frame on said attachment members for vertical relative movement therebetween; castor wheels supporting the rear extremity of said frame; a mast fixedly mounted on and arising from and moving as a fixed unit with said frame; a connecting member extending forwardly from said mast to said tractor; a second attachment means pivoting the forward extremity of said connecting member to said tractor above said first attachment means; and means for varying the length of said connecting member so as to rotate said frame about its pivot means on said attachment members, said frame comprising a horizontal transversally-extending member extending across and being pivotally mounted in said attachment members, said side arms being rigidly secured at their forward extremities to the extremities of said transversally-extending member and extending rearwardly therefrom in substantially parallel arrangement, said castor wheels being mounted below the rear extremities of said side arms, said mast being fixedly mounted on said horizontal transversally-extending member so as to move as a unit with said member and said side arms.

(References on following page)

References Cited in the file of this patent

UNITED STATES PATENTS

| | | |
|---|---|---|
| 2,428,857 | Smith | Oct. 14, 1947 |
| 2,536,405 | Whittier | Jan. 2, 1951 |
| 2,687,681 | Phenice | Aug. 31, 1954 |
| 2,722,876 | London | Nov. 8, 1955 |
| 2,732,640 | Kirchner | Jan. 31, 1956 |
| 2,795,060 | Geiszler | June 11, 1957 |
| 2,815,591 | Mattingly | Dec. 10, 1957 |
| 2,862,341 | Miller | Dec. 2, 1958 |
| 2,870,555 | Gurries et al. | Jan. 27, 1959 |
| 2,886,906 | Moses | May 19, 1959 |